(12) United States Patent
Lukk et al.

(10) Patent No.: US 9,094,675 B2
(45) Date of Patent: Jul. 28, 2015

(54) PROCESSING IMAGE DATA FROM MULTIPLE CAMERAS FOR MOTION PICTURES

(75) Inventors: Howard Lukk, North Hollywood, CA (US); Andrew Hendrickson, La Canada Flintridge, CA (US)

(73) Assignee: DISNEY ENTERPRISES INC., Burbank, CA (US)

( * ) Notice: Subject to any disclaimer, the term of this patent is extended or adjusted under 35 U.S.C. 154(b) by 396 days.

(21) Appl. No.: 13/423,058

(22) Filed: Mar. 16, 2012

(65) Prior Publication Data

US 2012/0176481 A1 Jul. 12, 2012

Related U.S. Application Data

(63) Continuation-in-part of application No. 12/165,039, filed on Jun. 30, 2008, now Pat. No. 8,358,332, and a continuation-in-part of application No. 12/040,573, filed on Feb. 29, 2008, now Pat. No. 8,228,327.

(51) Int. Cl.
*G06T 17/00* (2006.01)
*H04N 13/02* (2006.01)
*H04N 13/00* (2006.01)

(52) U.S. Cl.
CPC ......... *H04N 13/025* (2013.01); *H04N 13/0011* (2013.01); *H04N 13/0022* (2013.01); *H04N 13/0242* (2013.01); *H04N 13/0271* (2013.01); *H04N 13/0296* (2013.01)

(58) Field of Classification Search
USPC .......................................... 345/419, 420, 427
See application file for complete search history.

(56) References Cited

U.S. PATENT DOCUMENTS

| 6,639,596 | B1 * | 10/2003 | Shum et al. .................... 345/427 |
| 7,103,212 | B2 * | 9/2006 | Hager et al. ................... 382/154 |
| 7,379,583 | B2 * | 5/2008 | Zitnick et al. ................. 382/154 |
| 7,551,770 | B2 * | 6/2009 | Harman ......................... 382/154 |
| 7,884,823 | B2 * | 2/2011 | Bertolami et al. ............. 345/427 |
| 8,000,521 | B2 * | 8/2011 | Kira ............................... 382/154 |
| 8,213,711 | B2 * | 7/2012 | Tam et al. ...................... 382/162 |
| 8,223,192 | B2 * | 7/2012 | Gotsman et al. ................ 348/39 |
| 8,243,123 | B1 * | 8/2012 | Geshwind et al. .............. 348/42 |
| 8,384,763 | B2 * | 2/2013 | Tam et al. ....................... 348/43 |
| 2008/0316299 | A1 * | 12/2008 | Porwal ............................ 348/46 |
| 2010/0085423 | A1 * | 4/2010 | Lange .............................. 348/46 |
| 2011/0043613 | A1 * | 2/2011 | Rohaly et al. ................... 348/50 |
| 2013/0009952 | A1 * | 1/2013 | Tam et al. ...................... 345/419 |
| 2013/0257864 | A1 * | 10/2013 | Neuman et al. ............... 345/419 |

OTHER PUBLICATIONS

Wang et al. "Space-Time Light Field Rendering", IEEE 2007.*

(Continued)

*Primary Examiner* — Kimbinh T Nguyen
(74) *Attorney, Agent, or Firm* — Patterson & Sheridan, LLP (57) ABSTRACT

An approach is disclosed for generating stereoscopic image sequences. The approach includes receiving a plurality of image sequences, each image sequence captured from a distinct camera or other capture device in a multi-camera array. One image sequence is a primary image sequence and the other image sequences are secondary image sequences. The approach further includes generating, from the primary and at least one or more of the secondary image sequences, depth maps corresponding to images of the primary image sequence and generating, for each image in the primary image sequence, based on at least the depth maps and the corresponding images of the primary image sequence, stereoscopic images of a stereoscopic image sequence.

22 Claims, 7 Drawing Sheets

(56) References Cited

OTHER PUBLICATIONS

Fukushima et al. "Synthesizing Wide-angle and Arbitrary View-point Images from a Circular Camera Array". Published 2006.*

Vogiatzis et al. "Multi-View stereo via Volumetric graph-cuts and occlusion robust photo-consistency". Published 2007.*

Kang et al. "Extracting view-dependent depth maps from collection of images". Published 2004.*

* cited by examiner

PROCESSING IMAGE DATA FROM MULTIPLE CAMERAS FOR MOTION PICTURES

CROSS REFERENCE TO RELATED APPLICATIONS

This Application is a continuation-in-part of U.S. patent application Ser. No. 12/165,039, entitled "GENERATION OF THREE-DIMENSIONAL MOVIES WITH IMPROVED DEPTH CONTROL," filed on Jun. 30, 2008, which is hereby incorporated by reference in its entirety. This Application is also a continuation-in-part of U.S. patent application Ser. No. 12/040,573, entitled "NON-LINEAR DEPTH RENDERING OF STEREOSCOPIC ANIMATED IMAGES," filed on Feb. 29, 2008, which is hereby incorporated by reference in its entirety.

BACKGROUND

Description of the Related Art

Human beings normally use stereoscopic vision to see the world. That is, images perceived by the left-eye and the right-eye are slightly displaced from one another as a result of the placement of left and right eyes on a human head. The human brain combines these displaced images into one image and perceives depth via the principle of parallax.

To simulate a three-dimensional (3D) viewing experience, filmmakers developed stereoscopic image technology, in which two images of a scene, with an appropriate relative offset between them, are recorded in sequence. When the two images are played back in sequence, with one image sequence shown to left eye and the other image sequence shown to right eye, a viewer perceives depth in the scene.

To make stereoscopic motion pictures, interaxial distance between shooting cameras and toe-in angles of the cameras are usually selected for each shot as the motion picture is being made. However, different shots can be intercut during post-processing. To the extent that interaxial distance and toe-in angles are different between shots, a viewer's eyes must discontinuously adjust to different convergence distances (i.e., the distance from the eyes at which left- and right-eye images align) to view the shots. Such adjustments are unnatural and can induce headaches or other unpleasant side effects.

At the same time, objects within live-action stereoscopic motion pictures cannot be easily separated from underlying scenes for post-production manipulation of those objects. For example, in order to bring an object (e.g., a person) to the foreground of a stereoscopic scene, conventional techniques require manual or semi-automated rotoscoping of the object before the object is manipulated. That is, the object must be rotoscoped out of the underlying scene, a labor-intensive process, before the sterepscopic appearance of the object can be altered to make the object appear in the foreground of the scene.

SUMMARY

One aspect of the disclosure provides an approach for generating one or more stereoscopic image sequences, more referring to multi-view stereo. The approach includes receiving a plurality of image sequences, each image sequence captured from a distinct camera in a multi-camera array. The image sequences may include a primary image sequence and one or more sequences are secondary image sequences. In one aspect, one (or more) of the secondary image sequences may be captured using a plenoptic lens array. Alternatively (or additionally) time-of-flight devices (e.g., lidar or laser devices) may be integrated with the multi-camera array. The approach further includes generating, from at least the primary image sequence and one or more of the secondary image sequences, a depth map corresponding to each of a plurality of images of the primary image sequence, and generating, for each image in the plurality of images of the primary image sequence, based on at least the depth map and the corresponding images of the primary image sequence, at least two images of a stereoscopic image sequence.

In some aspects of the disclosure, the method further includes determining, based on at least the depth maps and the corresponding images of the primary image sequence, a set of objects within the primary image sequence. In such aspects, the method may further include associating each object of the determined set of objects with a distinct layer corresponding to the depth map and a distinct layer corresponding to the primary image and modifying at least one of the distinct layers.

BRIEF DESCRIPTION OF THE DRAWINGS

The above recited aspects are described in detail with the appended drawings. It is to be noted, however, that the appended drawings illustrate only typical aspects of this disclosure and are therefore not to be considered limiting of its scope, for this disclosure may be applied to other equally effective aspects.

DETAILED DESCRIPTION

When making motion pictures, having information about the depth of objects captured in a scene can be quite useful. While this can be accomplished in some circumstances by carefully staging the scene or by measuring locations of major objects in the scene, collecting this information automatically can make editing, special effects (FX) (e.g., match-moving and creating CG models of the scene), and other post-production activities much easier. In particular, automatically collecting or calculating depth information makes creating and editing a stereoscopic motion picture much simpler. Capturing a stereoscopic motion picture presents a variety of complications because each shot typically has to be carefully set up as many of the factors cannot easily be changed in post-production. For example, setting and adjusting lighting can take a large amount of time on set, and is difficult to change in post-production. Other factors including, for example, camera angle, camera motion, and depth of blur can be very hard to modify after the scene is shot. Some of these issues can be exacerbated when shooting with digital motion picture cameras, as they do not have the same capabilities as film (e.g., digital motion picture camera typically have a lower dynamic range). It would be useful and valuable to enable certain changes, that can currently only be adjusted during the shoot, to be made during post-production.

To address these (and other) issues, this disclosure presents a physical motion picture camera setup along with techniques for interpreting and analyzing the camera(s) output. In one aspect, a camera setup includes a digital motion picture camera and one or more additional (or satellite) motion picture cameras (or plenoptic lens system) mounted along with the primary motion picture camera. For example, a primary picture camera may include two satellite cameras, to the left and right of the primary camera, for capturing volumetric information, as described in U.S. patent application Ser. No. 12/165,039. Such a camera setup may be extended to include more cameras, such as a total of four motion picture cameras, with satellite cameras mounted to the left, right, top, and bottom sides of the primary camera. As another example, a camera setup may have a primary camera and a secondary plenoptic lens camera for capturing volumetric information or light-field information in parallel with motion picture image data captured by the primary camera. A light-field camera, also called a plenoptic camera, is a camera that uses a microlens array to capture multi-dimensional light field information about a scene.

Programmatic techniques may be used to determine the depth of the items in post-process by comparing the differences in the images captured by the secondary motion picture cameras after the initial capture is completed, as described in U.S. patent application Ser. No. 12/165,039.

More generally, aspects presented herein provide techniques for creating and manipulating stereoscopic motion pictures. In one aspect, a multi-camera array system includes one primary camera and a plurality of secondary cameras. The primary camera and the secondary cameras may be generator locked ("genlocked") to ensure frame coincidence at combining, mixing, or switching points. Further, time code synchronizes the frame numbers of motion picture data received via the primary and secondary cameras. Motion picture data from the multi-camera array system may undergo post-production processing. In some aspects, post-production processing includes scene selection, in which scenes from the motion picture data are selected for further processing, and creating depth maps and stereoscopic images based on the selected scenes. In particular, motion picture data from the plurality of secondary cameras may be used to generate a depth map via triangulation techniques. The depth map may then be used to modify and create pixel data from images captured from the primary camera, also referred to herein as primary images, into left- and right-eye images of a stereoscopic motion picture.

Another aspect includes extracting objects in a recorded scene based on a depth map of the scene and data recorded by the primary camera. The aspect may further include separating the objects onto different layers in the primary image and the depth map. Doing so allows the appearance of the objects on those layers to be modified by editing the primary image and the depth map.

The flowchart and block diagrams in the Figures illustrate the architecture, functionality and operation of possible implementations of systems, methods and computer program products according to various aspects of the present disclosure. In this regard, each block in the flowchart or block diagrams may represent a module, segment or portion of code, which comprises one or more executable instructions for implementing the specified logical function(s). In some alternative implementations the functions noted in the block may occur out of the order noted in the Figures. For example, two blocks shown in succession may, in fact, be executed substantially concurrently, or the blocks may sometimes be executed in the reverse order or out of order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Aspects presented in this disclosure may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the presented embodiments may take the form of a computer program product embodied in one or more computer readable medium(s) having computer readable program code embodied thereon.

Any combination of one or more computer readable medium(s) may be used. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium includes the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

Figure 1:
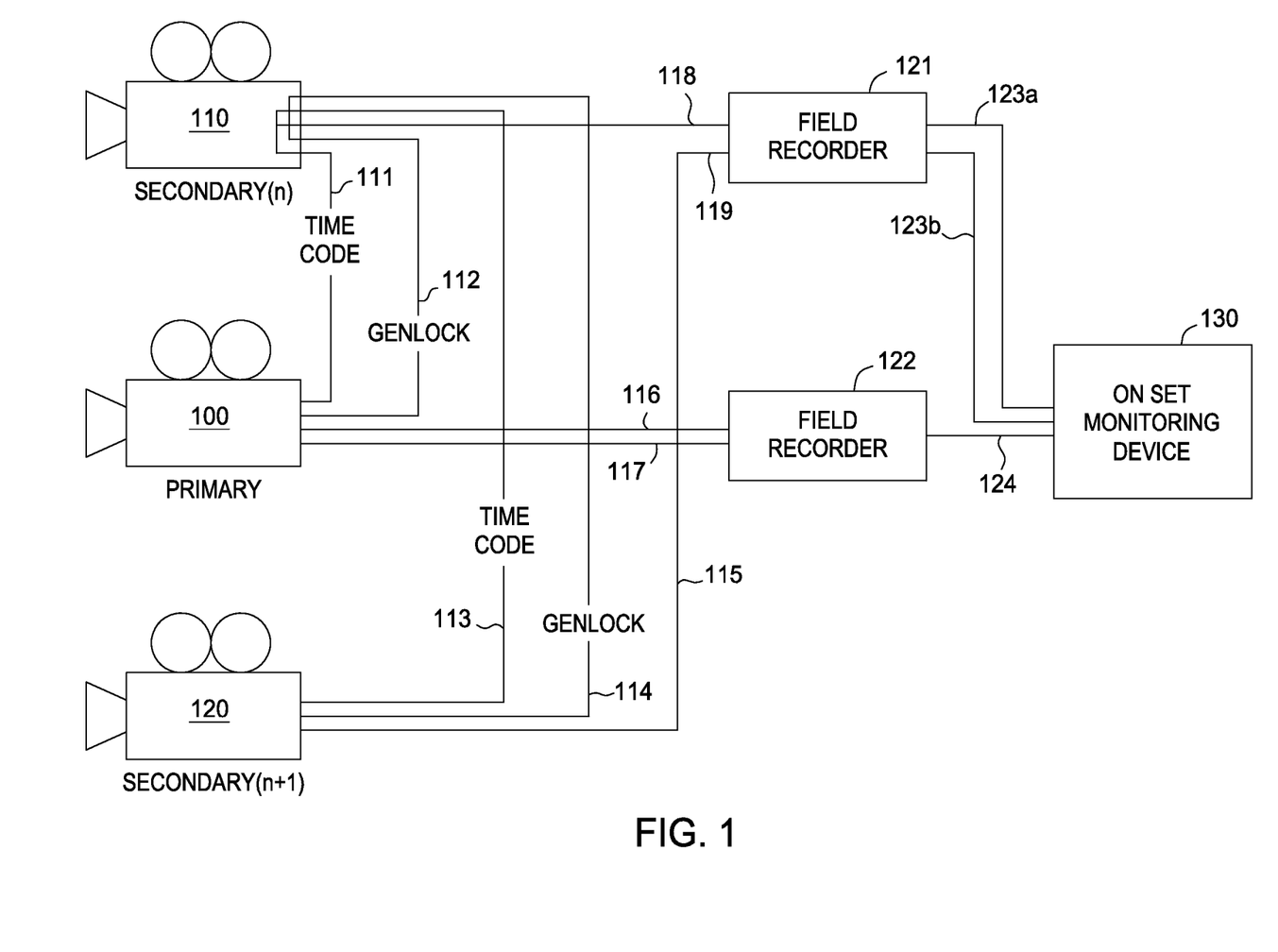
FIG. 1 illustrates a system configured to capture and record live-action motion picture data from multiple cameras, according to an aspect of the present disclosure.

FIG. 1 illustrates a system configured to capture and record live-action motion picture data from multiple cameras, according to an aspect of the present disclosure. The system includes a primary camera 100, two secondary cameras 110 (camera n) and 120 (camera n+1), a field recorder 121, and an on-set monitoring device 130. The primary camera 100 and the secondary cameras 110 and 120 may be digital or analog cameras (including plenoptic lens systems) that capture motion picture data as images, or frames, which may be viewed in sequence as images.

Note in an alternative embodiment, only a single secondary camera (camera n) is used and the primary camera 100 may serve as a secondary camera 120 (i.e., as camera 120 (n+1)) for creating stereoscopic images from the motion picture data captured via the primary camera 100. Further, more than two secondary cameras 110, 120 are contemplated. For example, a multi-camera array may include, three, four (or more) secondary cameras arranged around the primary camera 100, e.g., to the top, bottom, left, and right of primary camera 100, resulting in a multi-camera array with five total cameras. Of course, other arrangements are broadly contemplated. In the following discussion, the embodiment shown in FIG.

1—with one primary camera 100 and two secondary cameras, camera 110(*n*) and camera 120 (*n*+1)—is used as a reference for discussion.

In one aspect, secondary cameras 110 and 120 may be configured to have sufficiently high depth of field to permit generating depth maps for live-action scenes. For example cameras having relatively small sensor sizes may provide relatively high depth of field. In a further aspect, secondary cameras 110 and 120 may capture compressed images or light fields via a plenoptic system.

As shown in FIG. 1, the primary camera 100 and the secondary cameras 110(*n*) and 120 (*n*+1) are synchronized using a genlock cables 112 and 114 and time code cables 111 and 113. Specifically, the motion picture signal from the primary camera is used to synchronize secondary camera 110(*n*) via genlock 112, and looped through to synchronize secondary camera 120 (*n*+1) via genlock 114. As a result, the gears of primary camera 100 and secondary cameras 110(*n*) and 120 (*n*+1) are locked such that, for example, the shutters of primary camera 100 and secondary cameras 110 (*n*) and 120 (*n*+1) open and close synchronously. Further, time code cables 111 and 113 synchronously enumerate frames of motion picture data captured by primary camera 100 each of secondary cameras 110(*n*) and 120 (*n*+1), respectively.

In practice, a director may adjust primary camera 100 so as to capture a live-action scene with a desired composition and focus. At the same time, secondary cameras 110 (*n*) and 120 (*n*+1) may capture volumetric information corresponding to the scene via images taken from different vantage points. Although described with respect to genlocked secondary cameras, aspects of this disclosure may use non-genlocked cameras operating separately from the primary camera. In further aspects, more than two secondary cameras may be employed to improve field-of-view and to capture more volumetric information. For example, four secondary cameras, one mounted on each of the left, right, top, and bottom sides of the primary camera, may be used.

In yet further aspects, other volumetric capture devices may be used in lieu of (or in addition to) cameras, including, but not limited to, infrared devices, ultraviolet devices, acoustic devices, plenoptic or light field devices and time-of-flight devices (e.g., laser, lidar, etc.). Time-of flight devices capture depth data by sending out a pulse of sound or light and measure a time required for feedback from the pulse to be received. In each of the variations, a primary camera is used to capture motion picture data, while one or more secondary cameras, plenoptic cameras, or time of flight devices are used to simultaneously capture data used to create depth maps corresponding to the image data captured by the primary camera.

The field recorder 121 receives data from secondary cameras 110(*n*) and 120 (*n*+1) via cables 118 and 119. Similarly, field recorder 122 receives data from secondary cameras 100 via cables 116 and 117. Each of the field recorders 121 and field recorder 122 may be configured to record standard or high-quality digital images.

Field recorder 121 and field recorder 122 each output data to an on-set monitoring device 130. In particular, field recorder 121 provides two outputs, shown as cables 123*a* and 123*b*, which output images acquired by secondary cameras 110 (*n*) and 120 (*n*+1), respectively, to the on-set monitoring device 130. As shown, field recorder 122 provides one output, shown as cable 124, which outputs images acquired by primary camera 100.

The on-set monitoring device 130 receives inputs from the field recorder 121 and field recorder 122. The on-set monitoring device 130 permits output display based on data received over the cables 123*a*, 123*b*, and 124. That is, the on-set monitoring device 130 allows users to view images captured or being captured by primary camera 100 and secondary cameras 110 (*n*) and 120 (*n*+1) and recorded by field recorders 121 and 122. It also allows for confidence monitoring of the depth information captured in real time.

Figure 2:
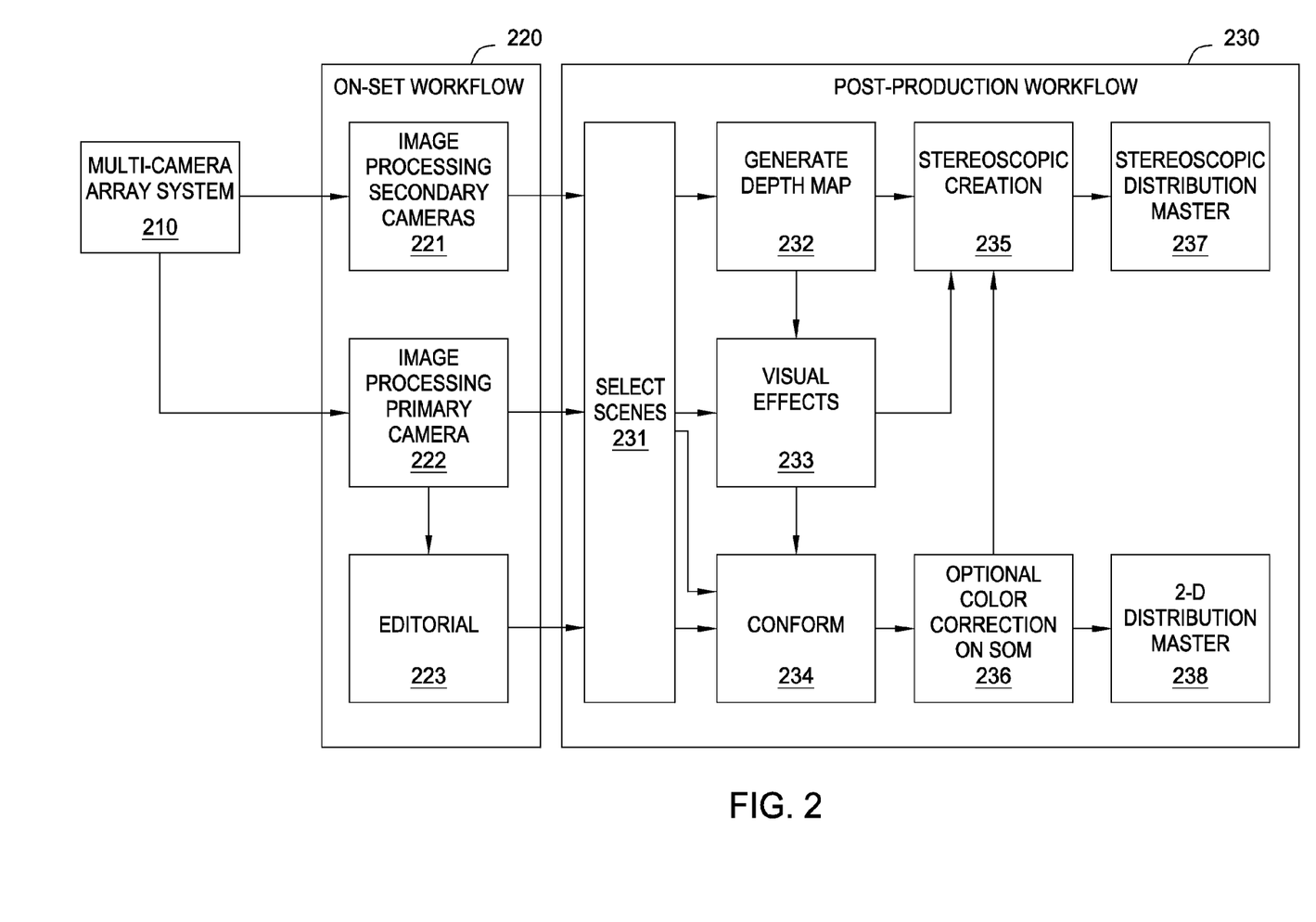
FIG. 2 is a flow diagram illustrating one aspect of a workflow for content creation.

FIG. 2 is a flow diagram illustrating one aspect of a workflow for content creation. As shown in FIG. 2, motion picture data is acquired via a multi-camera array system 210. The multi-camera array system 210 may include one primary camera and a plurality of secondary cameras or devices. In one aspect, the multi-camera array system may include one primary camera and two secondary cameras, such as those illustrated in FIG. 1.

On-set workflow 220 includes image processing of secondary images 221, image processing of primary images 222, and editorial processing of primary images 223. Image processing of primary and secondary images 221 and 222 may include setting a primary look, providing encoding for dailies (i.e., the first prints (or digital sequences) from cinematographic takes, made rapidly for film makers), and other functions normal to digital camera capture. In most aspects, secondary images 221 may not require dailies. Editorial processing may include converting the file format of primary images 223 to a different format (proxy) and scene selection. For example, a director may make a "first cut" or a "second cut" of a motion picture based on processed primary proxy images 223.

As shown in FIG. 2, post-production workflow 230 for two dimensional (2D) motion pictures (i.e., conventional motion picture images) includes selecting scenes 231, conforming based on the selected scenes 234, adding visual effects 233, color correction 236, and generating a 2D master 238. That is, post-production workflow for 2D motion pictures, with the exception of some visual effects 233 that may be added based on the depth map(s) created from the secondary camera system, is similar to the traditional steps of selecting scenes. Once a picture is "locked" so that no further scene selection is desired, a conform (i.e., assembly of the motion picture images according to the edit decision list) and a color correction may be performed to prepare the final conformed motion picture for distribution.

A post-production workflow 230 for stereoscopic (i.e., 3D) motion pictures includes selecting scenes 231, generating a depth map 232, adding visual effects 233, generating stereoscopic images 235, and generating a stereoscopic distribution master 237. Similar to 2D post-production scene selection, selecting scenes 231 includes viewing and editing the motion picture data until the picture is "locked." The process for generating a depth map 232 and generating stereoscopic images 235 are described in greater detail below. In one aspect, the selected depth maps created 232 may be configured to assist in the creation of visual effects 233.

Figure 3:
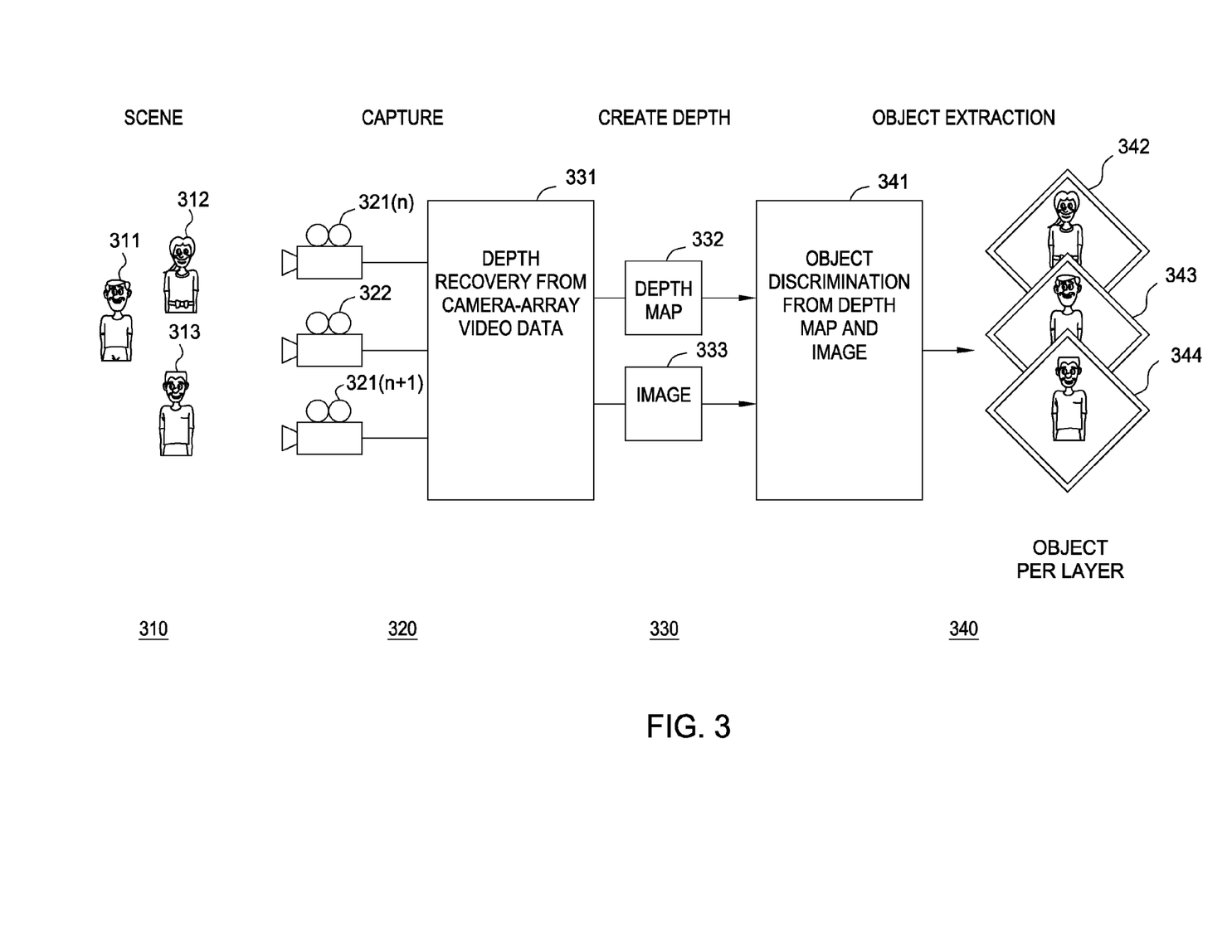
FIG. 3 illustrates an approach for extracting objects based on data from a multi-camera array.

FIG. 3 illustrates an approach for extracting objects based on data from a multi-camera array. As shown in panel 310, a scene includes three objects 311, 312, and 313. Although illustrated as humans, objects 311, 312, and 313 may generally include any animate or inanimate elements captured with cameras 321 (*n*), 322, and 321 (*n*+1).

In panel 320, cameras 321 (*n*), 322, and 321 (*n*+1) capture the scene of panel 310, including all objects. Cameras 321 (*n*), 322, and 321 (*n*+1) may be cameras within a multi-camera array system that includes a primary camera 322 and one or more secondary cameras 321 (*n*) and 321 (*n*+1), such as the system illustrated in FIG. 1.

Panel 330 shows depth recovery based on data from cameras 321 (*n*), 322, and 321 (*n*+1). In particular, image data from two or more of cameras 321 (*n*), 322, and 321 (*n*+1), in conjunction with information about the relative locations of cameras 321 (*n*), 322, and 321 (*n*+1), are used to determine the relative depth(s) of objects 311, 312, and 313, as well as the relative depth of other features of the scene depicted in panel 310. As shown in panel 330, depth recovery techniques are used to produce a depth map 332 associated with the scene as captured by cameras 321 (*n*), 322, and 321 (*n*+1). The depth map 332 may indicate, on a per-pixel basis, the relative depth of each pixel in a corresponding primary image.

In panel 340, depth map 332 and an image 333, which may be one of the images captured by camera 321 (*n*), 322, or 321 (*n*+1) is used for object discrimination 341. That is, objects 311, 312, and 313, as captured by cameras 321 (*n*), 322, and 321 (*n*+1), are extracted from the captured scene based on depth map 332 and image 333. In one aspect, each discriminated object may be placed on a distinct layer corresponding to depth map 332. For example, distinct layers corresponding to image 333 for objects 311, 312, and 313 are depicted in panel 340 as layers 342, 343, and 344, respectively. Each object layer may then be manipulated, as described in greater detail below, so as to change the appearance of the object in a stereoscopic image later generated from the primary image 333 based on depth information indicated by depth map 332.

Figure 4:
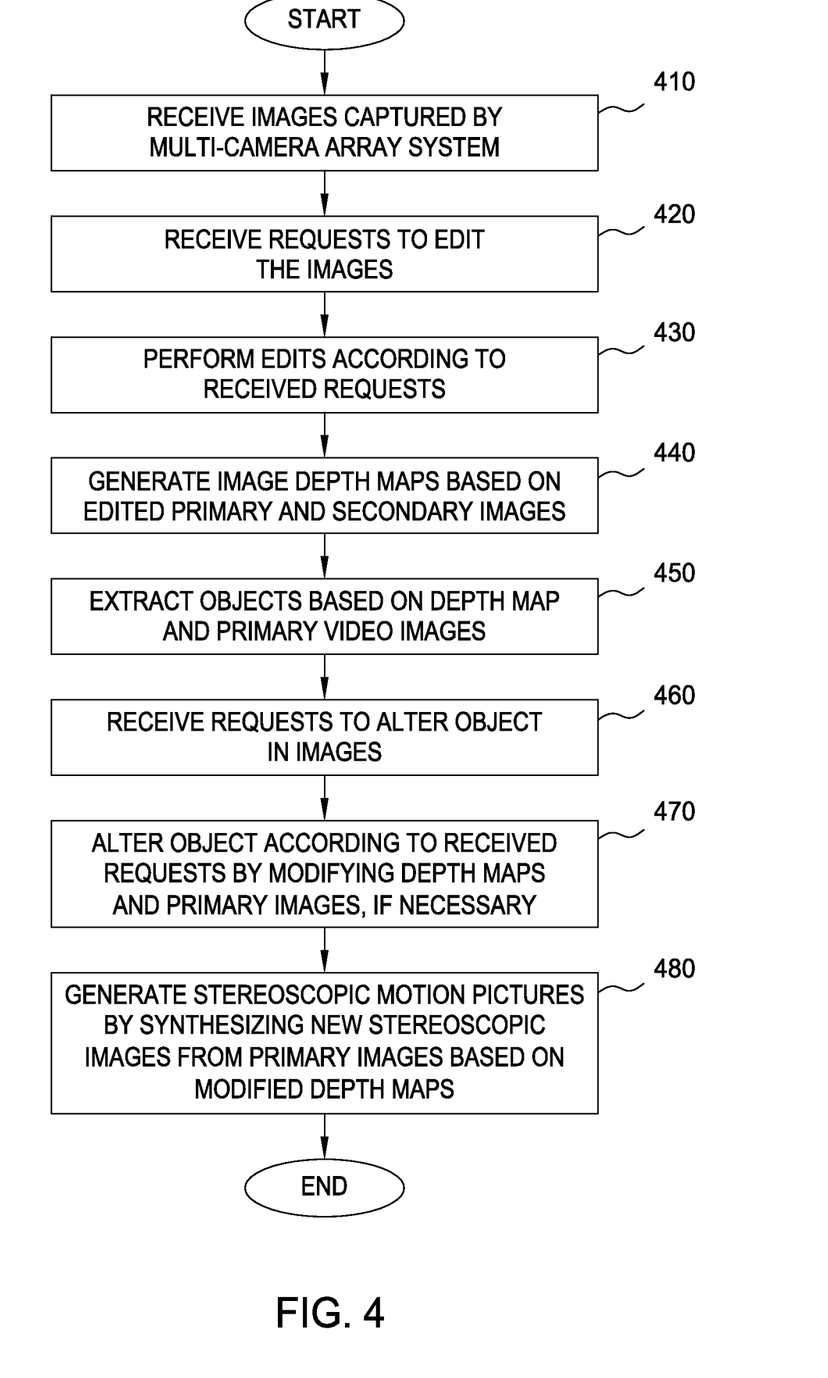
FIG. 4 is a flow diagram illustrating one aspect of an approach for post-production processing of data from multiple cameras.

FIG. 4 is a flow diagram illustrating a method 400 for post-production processing image data from multiple cameras. As shown, the method 400 begins at step 410, where a computer receives image data captured by a multi-camera array system, such as the system illustrated in FIG. 1.

At step 420, the computer receives a request to edit the motion picture data captured by the primary camera. For example, a user may interact with motion picture editing tools to trim, split, cut, splice, etc. portions of motion picture captured by the primary camera. At step 430, an editing application running on the computer performs the requested edits. That is, the computer modifies the motion picture data of each camera according to the requested edits. (Scene selection)

At step 440, the computer generates depth maps based on the selected scenes from secondary images. Each depth map may indicate, on a per-pixel basis, the relative depth of each pixel in a corresponding primary image. For example, the depth map may be a monochrome image, and the luminance value of each pixel may indicate the distance from the viewer of a corresponding pixel in a primary image. In generating depth maps, any feasible depth-estimation algorithm may be used. For example, "hybrid recursive matching," as described in R. Tanger et al., "Trinocular Depth Acquisition," *SMTPE Motion Imaging Journal*, May/June 2007, incorporated herein by reference, may be employed. Other methods for depth-map creation may also be used.

At step 450, an object extraction application running on the computer may extract one or more objects based on depth maps generated at step 440 and primary motion picture images associated with those depth maps. For example, edges may be detected based on luminance and color for a monochrome depth map image and a corresponding color primary image, respectively. The detected edges may then be used in conjunction with depth map-to-primary image pixel correlation to isolate objects. Alternatively, editors may assist the object extraction software to isolate and extract objects by, for example, manually indicating the edge of the object as it appears in the depth map or the primary image.

At step 460, an object modification application running on the computer receives a request to alter the appearance of objects in images of the primary camera, also referred to herein as primary images, or depth map images. For example, the primary image may be altered by changing its color balance or by moving, modifying, or adding objects. Because pixels in the primary image are displaced to produce stereoscopic images for left and right eyes, changes to any primary image affect the stereoscopic images generated based on that primary image. As noted, in addition to producing a left and right eye image, multi-view or auto-stereoscopic images may be created by generating 9 or 27 stereoscopic images from the source image. Similarly, the depth map may be altered by, for example, modifying luminance values of one or more pixels of the depth map to move the placement of the objects in 3D space. Because the depth map image is a basis for determining the displacement of pixels in generating stereoscopic images, changes to the depth map affect the perceived depth and features of objects as they appear within the stereoscopic images. That is, the depth at which an object appears to a viewer, as depicted in the stereoscopic images, may be modified by adjusting the average luminance value of pixels of the object as it appears in the depth map. Further, individual pixels of the object may be altered in the depth map, thereby changing the appearance of corresponding pixels in the stereoscopic images.

The luminance levels of successive depth maps, i.e., two or more depth maps that follow each other, and of objects within those successive depth maps may be adjusted so as to effectuate smooth 3-D transitions. That is, successive depth maps may be adjusted such that a viewer's convergence distance between shots or scenes changes gradually, thereby providing a comfortable viewing experience. For example, pixel luminance of one depth map may be changed on a frame by frame basis with a scene to gradually change the stereopsis of that scene. Further, an application running on the computer may automatically adjust depth maps for effect. For example, the layer corresponding to an object may be held constant, while all other layers are manipulated. Further still, objects within depth maps may be adjusted in conjunction with adjustments to the primary image to change the viewpoint of the scene. That is, the objects may be adjusted in both the primary image and the depth map to make the stereoscopic image appear from a different viewpoint (i.e., to make the stereoscopic image appear to have been shot from a different vantage point). In such aspect case, images captured by the secondary cameras may be used to help fill "holes" for which primary camera data is unavailable.

At step 470, the object modification application modifies primary images and/or depth map images based on the requests received at step 460. For example, algorithms well known to persons skilled in the art may be employed to change the color balance of the primary image or to add a circular gradient to a surface of an object in a depth map. Although described with respect to FIG. 4 as a part of the stereoscopic image creation process, object modification is not required to generate stereoscopic images.

At step 480, a stereoscopic motion picture creation application running on the computer generates a stereoscopic image for each frame of a motion picture by synthesizing the primary images into left- and right-eye images based on the modified depth map associated with the primary image. That is, the pixels of the primary image are displaced or translated to create left- and right-eye images based on depths indicated for those pixels in the depth map. Note, although described above using luminance values as a reference example for a depth map, other measures or depth map representations may be used. For example, deep compositing (or other techniques now or later developed) may be used to represent the depth of objects or regions depicted in the motion picture.

Figure 6:
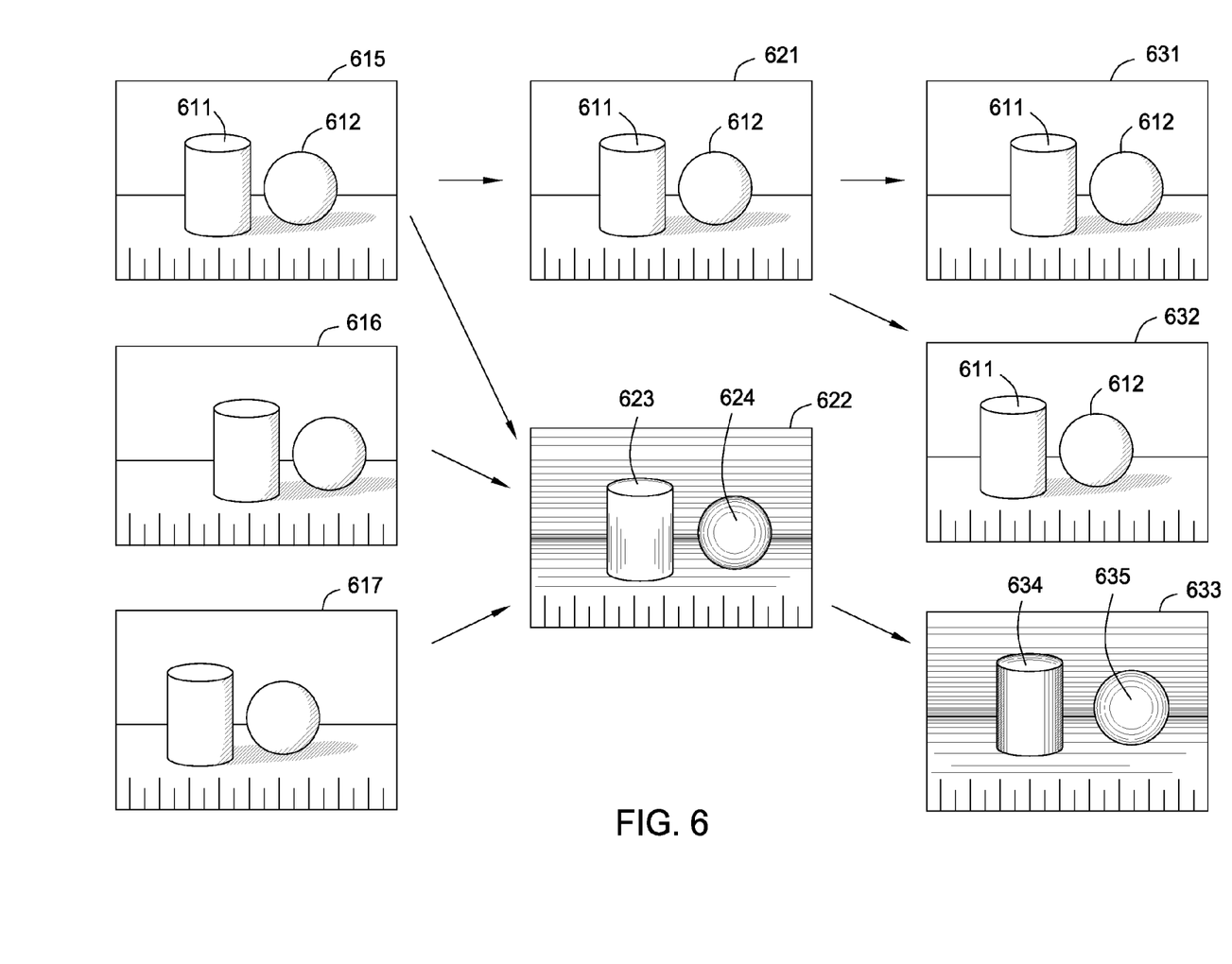
FIG. 6 illustrates an example of post-production processing of motion picture data.

In one aspect, the mathematical transformation used to generate the stereoscopic images may model "bent," as opposed to straight, light rays. For example, a warp map according to U.S. patent application Ser. No. 12/040,573, titled "Non-linear Depth Rendering of Stereoscopic Animated Images," incorporated herein by reference in its entirety, may be used to bend light rays in generating the stereoscopic images. In another aspect, data from secondary images 616 and 617, or other images captured by secondary cameras or the primary camera, may be used to help fill holes in the stereoscopic images. Further, data from secondary images 616 and 617 may be used to enhance the resolution, quality, or zoom of the stereoscopic images, or the frame rate of a motion picture including those stereoscopic images. For example, data from secondary images 616 and 617 may be added to the stereoscopic images so as to enhance the detail of those stereoscopic images, eliminate defects such as motion blur, and reduce noise. In yet another aspect, one or more of the primary and secondary cameras may be configured to capture different lighting conditions, and the data from the cameras can be used to generate stereoscopic images with high dynamic range or to relight the scene in post production by "placing" a light where a virtual camera could have been.

Figure 5A:
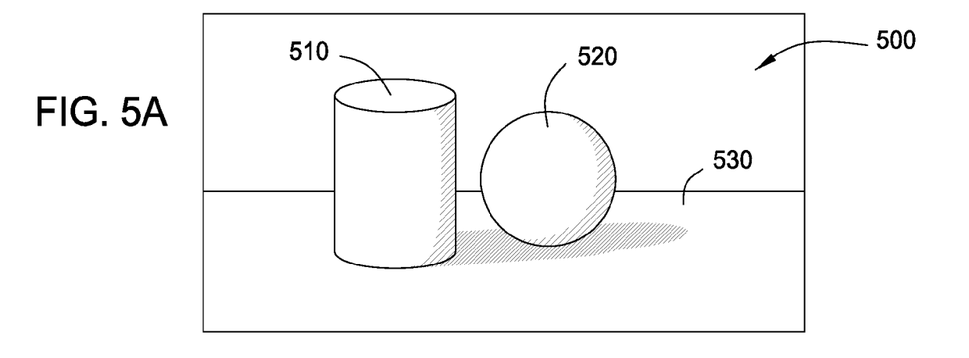
FIGS. 5A-C illustrates an example image and example depth maps associated with the image.
Figure 5B:
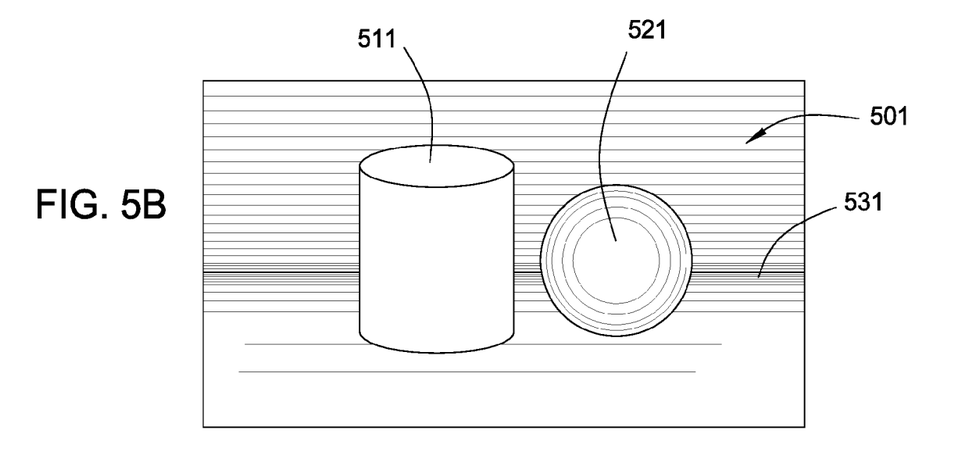
Figure 5C:
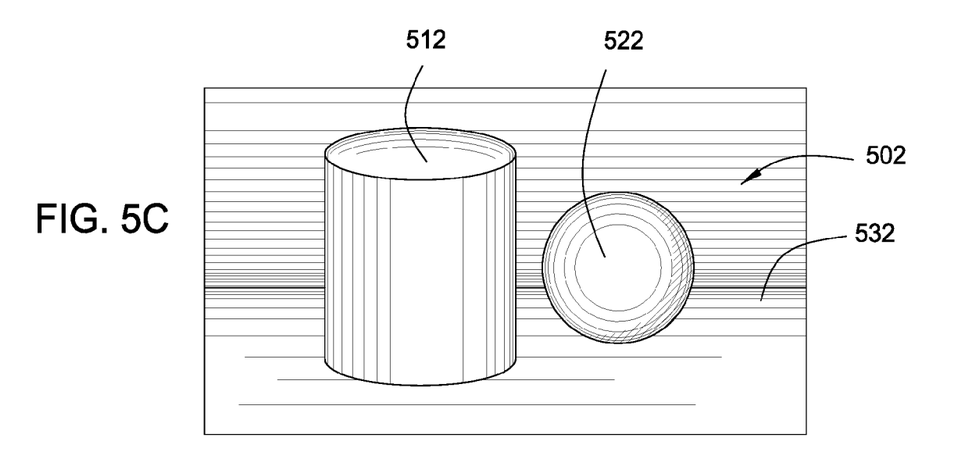

FIGS. 5A-5C illustrate an example image and example depth maps associated with the image. As shown in FIG. 5A, the image includes cylinder 510, sphere 520, and surface 530. Cylinder 510 and sphere 520 rest on top of surface 530, with cylinder 510 in front and to the left of sphere 520. FIGS. 5B and 5C illustrate depth maps generated based on image 500. As shown, depth map 501 includes a representation of the cylinder 511, a representation of the sphere 521, and a representation of the surface 531. Likewise, depth map 502 includes a representation of the cylinder 521, a representation of the sphere 522, and a representation of the surface 532. Each of depth maps 501 and 502 includes indications of the depth at which cylinder 510, sphere 520, and surface 530 appear in image 500. As shown, depth maps 501 and 502 are monochrome images whose pixel luminance values indicate the depth of those pixels. In particular, higher luminance values in depth maps 501 and 502 indicate lesser distance to the viewer, whereas lower luminance values indicate greater distance from the viewer. Accordingly, the pixels of cylinder 510 have a greater average luminance than the pixels of sphere 520 in depth maps 501 and 502, indicating that cylinder 510 is "closer" to the viewer than sphere 520. Further, depth map 502 depicts areas within cylinder 512, sphere 522, and surface 532 having greater and lesser luminance. As a result, depth map 502 more closely distinguishes depths of areas within cylinder 512, sphere 522, and surface 532. For example, pixels of sphere 522 closer to the viewer may have greater luminance values.

FIG. 6 illustrates an example of post-production processing of motion picture data. As shown, image 615, image 616, and image 617 represent images from images captured by primary camera 100, secondary camera 110 (*n*), and secondary camera 120 (*n*+1), respectively. Depth map 622 is generated based on images 615, 616 and 617, i.e., the images captured by the primary and one or more secondary cameras. As with depth maps 501 and 502, depth map 622 is a monochrome image in which intensity of a pixel indicates the relative distance from a viewing camera. In particular, depth map 622 indicates that cylinder 623 appears closer to the viewer than sphere 624, because the pixels representing cylinder 623 have greater intensity (i.e., are lighter) than the pixels representing sphere 624.

Depth map 633 corresponds to depth map 622, but with modifications to pixels corresponding to cylinder 623 and sphere 624. As shown, the pixels corresponding to cylinder 623 have been altered in cylinder 634 so as to indicate a greater distance from the viewer. Further, the pixels corresponding to sphere 624 have been altered in sphere 635 to indicate a lesser distance from the viewer. In one aspect of this disclosure, depth map 633 is created from depth map 622 by extracting cylinder 623 and sphere 624 from depth map 622 and placing those objects on separate layers. Each layer may then be modified to change one or more properties of cylinder 623 and sphere 624 as they appear in the depth map. As shown, the luminance of pixels of the cylinder, as it appears within its depth map layer, has been adjusted so that the average luminance value of the cylinder is lesser in depth map 633 than in depth map 622. In contrast, the luminance of the sphere, as it appears within its depth map layer, has been adjusted so that the value of pixels of the sphere is greater in depth map 633 than in depth map 622. The foregoing modifications to the cylinder and sphere layers corresponding to an increase in the distance from the viewer for the cylinder and a decrease in the distance from the viewer for the sphere.

Image 621 is the same as image 615 and is used to generate stereoscopic images 631 and 632 based on depth map 622. Specifically, a stereoscopic image is generated by, synthesizing the image 615 into left-eye image 632, and right-eye image into 631 based on depth map 633. As shown, left- and right-eye images 631 and 632 each include a cylinder, a sphere, and a surface on which the cylinder and sphere rest. Cylinder 611 of image 621 appears shifted in left- and right-eye images 631 and 632. More specifically, objects will be shifted between left eye and right eye, making them appear to be further or closer to the viewer while viewing a Stereoscopic presentation. This results, because, as described above, the value of pixels in cylinder 634 of depth map 633 is less than the value of pixels in cylinder 623 of depth map 622. As noted, in addition to creating a left- and right-eye images, another alternative is to create multiple images (e.g., 9 or 27) used to create auto-stereoscopic images that create the appearance of depth in images without requiring special glasses to be worn by a viewer.

Similarly, sphere 612 of image 621 appears shifted in left- and right-eye images 631 and 632 because, as described above, the value of pixels in sphere 635 of depth map 633 is greater than the value of pixels in sphere 624 of depth map 622.

Left- and right-eye images 631 and 632 further include hole areas 637 and 638, for which no pixel data is directly available from image 621. In particular, no pixels from image 621 project to hole areas 637 or 638 because hole areas 637 and 638 depict content obstructed from the primary camera's view by cylinder 611 and thus not captured in image 621. In some aspects of the present disclosure, holes such as hole areas 637 and 638 are filled at least in part by using data from secondary images 616 and 617, as discussed in greater detail above.

Figure 7:
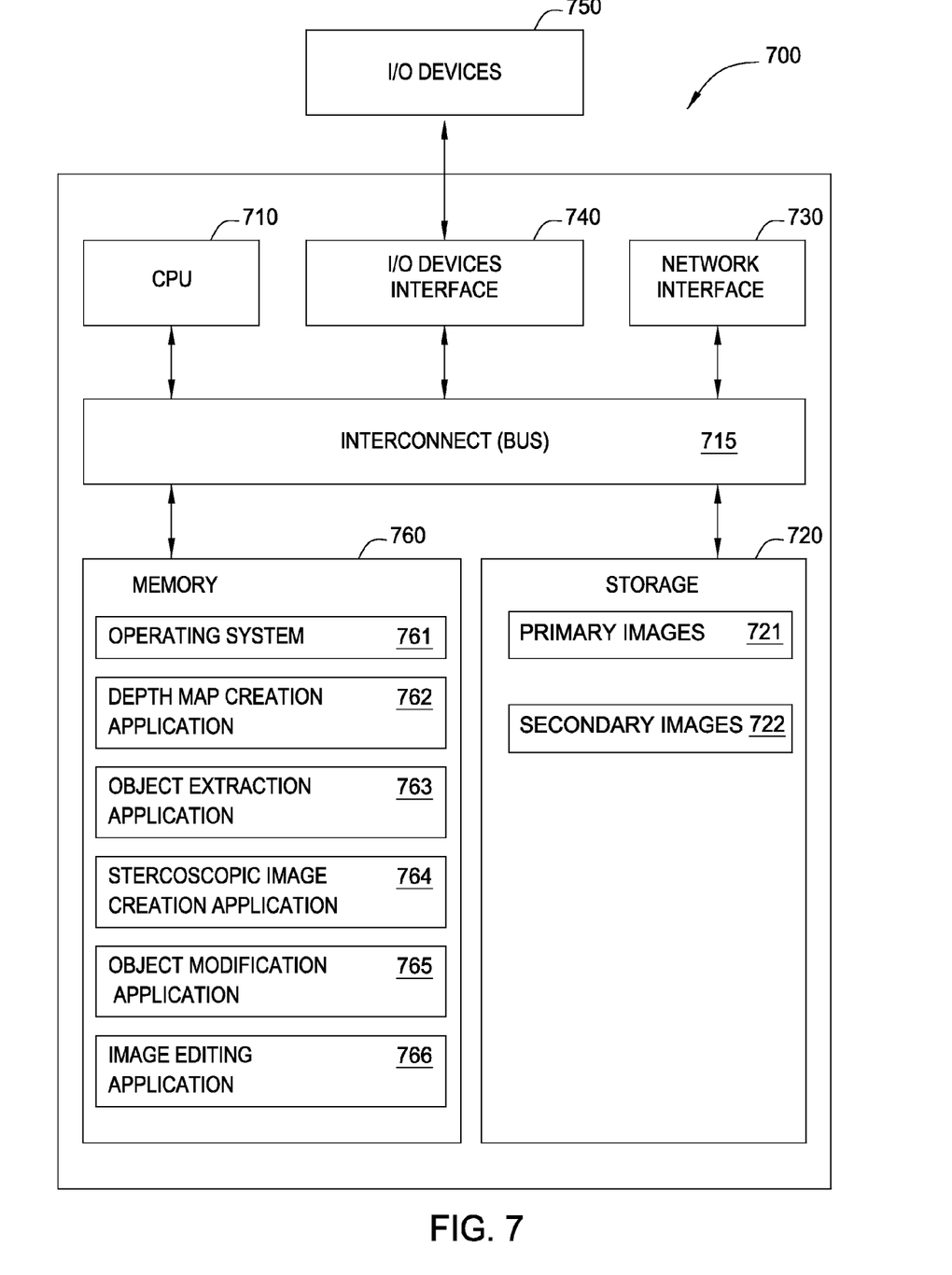
FIG. 7 is a block diagram illustrating a system configured to provide post-production processing of data from multiple cameras, according to an aspect of this disclosure.

FIG. 7 is a block diagram illustrating an example system 700 configured to provide post-production processing of data from multiple cameras, according to an aspect of this disclosure. As shown, the system 700 includes, without limitation, a central processing unit (CPU) 710, a network interface 730, an interconnect 715, a memory 760 and storage 720. The system 700 may also include an I/O device interface 740 connecting I/O devices 750 (e.g., keyboard, display and mouse devices) to the system 700.

The CPU 710 retrieves and executes programming instructions stored in the memory 760. Similarly, the CPU 710 stores and retrieves application data residing in the memory 760. The interconnect 715 facilitates transmission, such as of programming instructions and application data, between the CPU 710, I/O device interface 740, storage 720, network interface 730, and memory 760. CPU 710 is included to be representative of a single CPU, multiple CPUs, a single CPU having multiple processing cores, and the like. And the memory 760 is generally included to be representative of a random access memory.

Storage 720 may be a disk drive storage device. Although shown as a single unit, storage 720 may be a combination of fixed and/or removable storage devices, such as fixed disc drives, solid state devices (SSD), removable memory cards or optical storage, network attached storage (NAS), or a storage area-network (SAN), etc. As shown, storage 720 includes primary motion picture date 721 and secondary motion picture data 722 corresponding to motion picture data captured by a primary motion picture and secondary images of a multi-camera array system, respectively.

Note, system 700 is included to be representative of a physical computing system as well as virtual machine instances hosted on a set of underlying physical computing systems. Further still, although shown as a single computing system, one of ordinary skill in the art will recognize that the components of the system 700 shown in FIG. 7 may be distributed across multiple computing systems connected by a data communications network.

As shown, the memory 760 includes an operating system 761 and applications 762-766. The applications 762-766 include a depth map creation application 762 configured to generate depth maps based on images captured by a multi-camera array system, as described in greater detail above. The applications 762-766 further include an object extraction application 763 configured to extract objects of an image onto separate layers based on a depth map corresponding to the image. For example, objects may be extracted based on edge and color data, as described above.

Applications 762-766 further include a stereoscopic motion picture creation application 764 configured to generate left- and right-eye images based on an image and a depth map. For example, the stereoscopic motion picture creation application 764 may employ a mathematical transformation to displace pixels of a primary image and thereby generate left- and right-eye images. Further, the stereoscopic motion picture creation application 764 may perform hole filling using data from one or more secondary images, as described above. In alternative aspects, stereoscopic motion picture creation application 764 may be configured to generate a plurality of images, including N images for auto-stereoscopic images. For example, the motion picture creation application 764 may create 9 or 27 different images that, when composited and viewed, create a 3D depth effect that does not require the use of special glasses. In addition, applications 762-766 include an object modification application 765 configured to permit a user to modify the appearance of the object in an image and/or an associated depth map. Modifying the appearance of the object in an image and/or an associated depth map causes the final stereoscopic motion picture produced from the image and the associated depth map to be altered accordingly. Finally, applications 762-766 includes a motion picture editing application 766 permits the user to edit motion picture data captured via primary camera of a multi-camera array system. That is, motion picture editing application 766 can be use to edit (e.g., trim, split, cut, splice, etc.) image sequences captured by the multi-camera array system.

Advantageously, aspects of this disclosure allow depth to be composed in post-production processing and scene objects to be extracted based on a depth map and a primary image. As a result, aspects of this disclosure provide increased control over depth, including how much a viewer's convergence distance varies between shots or scenes, so as to enable motion picture film makers to provide a comfortable viewing experience with relatively few abrupt shifts in convergence distances. Further, aspects of this disclosure provide an approach for extracting objects from a scene without rotoscoping, a labor-intensive process.

While the foregoing is directed to aspects of the present disclosure, other and further aspects of this disclosure may be devised without departing from the basic scope thereof, and the scope thereof is determined by the claims that follow.

What is claimed is:

1. A computer-implemented method for processing image data, comprising:

receiving a plurality of image sequences, each image sequence captured from a distinct physical camera in a physical multi-camera array, wherein the image sequences include a primary image sequence captured by a primary camera in the multi-camera array and one or more secondary image sequences captured by respective secondary cameras in the multi-camera array, wherein the primary camera captures live-action scenes with a user-specified composition and focus, and wherein each of the secondary cameras captures volumetric information corresponding to the live-action scenes from a different vantage point;

generating, from at least the primary image sequence and one or more of the secondary image sequences, a respective depth map for each of a plurality of images of the primary image sequence;

automatically determining, based on at least one of the depth maps and corresponding image or images of the primary image sequence, an object depicted in the primary image sequence;

automatically separating the determined object onto a distinct layer associated with at least one of the depth maps and a distinct layer or layers associated with a corresponding image or images;

modifying an appearance of the object in at least one of the distinct layer associated with the at least one of the depth maps and the distinct layer or layers associated with the corresponding image or images so as to change an appearance of the object in stereoscopic images; and generating, for each image in the plurality of images of the primary image sequence, based on at least the image and the corresponding depth map, at least two images of a stereoscopic image sequence.

2. The method of claim 1, wherein generating the stereoscopic images includes filling a hole in at least a first stereoscopic image using image data from one or more images of the secondary image sequences, wherein the hole corresponds to an area in the first stereoscopic image for which image data of a scene captured in the corresponding image of the primary image sequence is unavailable.

3. The method of claim 1, wherein at least one of the secondary cameras provides a plenoptic lens configured to capture light field data.

4. The method of claim 1, wherein the at least two images include a left-eye image and a right-eye image, and wherein an appearance of the objects in the left-eye image and an appearance of the objects in the right-eye image are displaced from their respective positions in the corresponding image of the primary image sequence.

5. The method of claim 1, further comprising, prior to generating the depth maps:

receiving a set of images of the primary image sequence and one or more editing operations to be performed on the set of images; and performing the one or more editing operations on the set of images.

6. The method of claim 1, further comprising, changing a viewpoint of a viewer of the stereoscopic image sequence based on at least the depth maps and the corresponding images of the primary image sequence.

7. The method of claim 1, further comprising, applying at least one graphical effect to one or more images of the primary image sequence based on data from one or more images of the secondary image sequences, wherein the graphical effect comprises at least one of enhancing a resolution, altering a zoom or a lighting, removing a defect, or increasing a frame rate of the stereoscopic image sequence.

8. The method of claim 1, wherein the generating the at least two images of the stereoscopic image sequence comprises generating an auto-stereoscopic image sequence.

9. A non-transitory computer-readable storage medium storing a program, which, when executed by a processor performs an operation for processing image data, the operation comprising:
   receiving a plurality of image sequences, each image sequence captured from a distinct physical camera in a physical multi-camera array, wherein the image sequences include a primary image sequence captured by a primary camera in the multi-camera array and one or more secondary image sequences captured by respective secondary cameras in the multi-camera array, wherein the primary camera captures live-action scenes with a user-specified composition and focus, and wherein each of the secondary cameras captures volumetric information corresponding to the live-action scenes from a different vantage point;
   generating, from at least the primary image sequence and one or more of the secondary image sequences, a respective depth map for each of a plurality of images of the primary image sequence;
   automatically determining, based on at least one of the depth maps and corresponding image or images of the primary image sequence, an object depicted in the primary image sequence;
   automatically separating the determined object onto a distinct layer associated with at least one of the depth maps and a distinct layer or layers associated with a corresponding image or images;
   modifying an appearance of the object in at least one of the distinct layer associated with the at least one of the depth maps and the distinct layer or layers associated with the corresponding image or images so as to change an appearance of the object in stereoscopic images; and
   generating, for each image in the plurality of images of the primary image sequence, based on at least the image and the corresponding depth map, at least two images of a stereoscopic image sequence.

10. The computer-readable storage medium of claim 9, wherein the operation further comprises, filling a hole in at least one of the images of the stereoscopic image sequence using image data from one or more images of the secondary image sequences, wherein the hole corresponds to an area in the one of the images of the stereoscopic image sequence for which image data of a scene captured in the corresponding image of the primary image sequence is unavailable.

11. The computer-readable storage medium of claim 9, wherein at least one of the secondary cameras provides a plenoptic lens configured to capture light field data.

12. The computer-readable storage medium of claim 9, wherein the at least two images include a left-eye image and a right-eye image, and wherein an appearance of the objects in the left-eye image and an appearance of the objects in the right-eye image are displaced from their respective positions in the corresponding image of the primary image sequence.

13. The computer-readable storage medium of claim 9, wherein the operation further comprises, prior to generating the depth maps:
   receiving a set of images of the primary image sequence and one or more editing operations to be performed on the set of images; and
   performing the one or more editing operations on the set of images.

14. The computer-readable storage medium of claim 9, wherein the operation further comprises, changing a viewpoint of a viewer of the stereoscopic image sequence based on at least the depth maps and the corresponding images of the primary image sequence.

15. The computer-readable storage medium of claim 9, wherein the operation further comprises, applying at least one graphical effect to an image of the primary image sequence based on data from one or more images of the secondary image sequences, wherein the graphical effect comprises at least one of enhancing a resolution, altering a zoom or a lighting, removing a defect, or increasing a frame rate of the stereoscopic image sequence based on data from one or more images of the secondary image sequences.

16. A system, comprising:
   a processor; and
   a memory, wherein the memory includes an application program configured to perform an operation, the operation comprising:
      receiving a plurality of image sequences, each image sequence captured from a distinct physical camera in a physical multi-camera array, wherein the image sequences include a primary image sequence captured by a primary camera in the multi-camera array and one or more secondary image sequences captured by respective secondary cameras in the multi-camera array, wherein the primary camera captures live-action scenes with a user-specified composition and focus, and wherein each of the secondary cameras captures volumetric information corresponding to the live-action scenes from a different vantage point,
      generating, from at least the primary image sequence and one or more of the secondary image sequences, a respective depth map for each of a plurality of images of the primary image sequence,
      automatically determining, based on at least one of the depth maps and corresponding image or images of the primary image sequence, an object depicted in the primary image sequence,
      automatically separating the determined object onto a distinct layer associated with at least one of the depth maps and a distinct layer or layers associated with a corresponding image or images,
      modifying an appearance of the object in at least one of the distinct layer associated with the at least one of the depth maps and the distinct layer or layers associated with the corresponding image or images so as to change an appearance of the object in stereoscopic images, and
      generating, for each image in the plurality of images of the primary image sequence, based on at least the image and the corresponding depth map, at least two images of a stereoscopic image sequence.

17. The system of claim 16, wherein at least one of the secondary cameras provides a plenoptic lens configured to capture light field data.

18. The system of claim 16, wherein the multi-camera array further comprises at least one time-of-flight device configured to capture depth information in conjunction with the primary image sequence captured by the primary camera.

19. A multi-camera array, comprising:
a primary physical camera configured to capture a primary image sequence of a live-action scene with user-specified composition and focus; and
one or more secondary physical cameras each capturing a secondary image sequence of the scene, wherein each of the secondary cameras provides volumetric information corresponding to the live-action scene from a different vantage point, and wherein the secondary cameras have sufficient depth of field to permit depth maps to be generated for images in the primary image sequence,
wherein the image sequences captured by the one or more secondary cameras are used to generate depth maps during post-production processing of the primary image sequence,
wherein an object depicted in the primary image sequence is automatically determined based on at least one of the depth maps and corresponding image or images of the primary image sequence,
wherein the determined object is automatically separated onto a distinct layer associated with at least one of the depth maps and a distinct layer or layers associated with a corresponding image or images,
wherein an appearance of the object is modified in at least one of the distinct layer associated with the at least one of the depth maps and the distinct layer or layers associated with the corresponding image or images so as to change an appearance of the object in stereoscopic images,
and wherein image sequences captured by the primary camera and the depth maps are used to generate stereoscopic image sequences.

20. The multi-camera array of claim 19, wherein at least one of the secondary cameras provides a plenoptic lens configured to capture light field data.

21. The multi-camera array of claim 19, wherein the secondary cameras are generator locked with the primary camera such that the secondary cameras operate synchronously with the primary camera, and wherein time codes of the secondary cameras are synchronized with time codes of the primary camera.

22. The multi-camera array of claim 19, wherein the array further comprises at least one time-of-flight device configured to capture depth information.

\* \* \* \* \*